2,818,397

AQUEOUS UREA-FORMALDEHYDE STARCH ADHESIVES AND PROCESS OF MAKING

George S. Casebolt, Summit, N. J., assignor to American Cyanamid Company, New York, N. Y., a corporation of Maine No Drawing. Application February 15, 1954
Serial No. 410,419

11 Claims. (Cl. 260—17.3)

This invention relates to a water-resistant starch resin adhesive. More particularly, this invention relates to a starch resin adhesive possessing increased body and improved tack and to the method of producing the same.

It is well known in the art to prepare starch resin adhesive compositions of a starch, synthetic resin and a catalyst in the presence of sufficient water to obtain a fluid composition. The preparation of a typical formulation consists in cooking the starch, resin and catalyst in water at an elevated temperature until the material passes through a certain range of increased viscosity at which time the starch-resin paste is cooled to yield the final product. This type of adhesive is not entirely satisfactory inasmuch as it has comparatively little body, being a water suspension of the solids. In an attempt to correct this deficiency, increased amounts of partially dextrinized starch are added to the composition in the hope of building up the solids content of the paste to a point where it assumes a syrupy consistency. The resulting increased starch solids in the adhesive composition are not entirely satisfactory inasmuch as critical control steps have to be taken during the formation of the product. Also, the useful life of the starch-resin paste is shortened considerably since the high solids content of the paste causes it to age very rapidly.

It is an object of my invention to prepare a water-resistant starch resin adhesive composition. It is a further object of my invention to produce a starch resin adhesive composition possessing increased body and tackiness without an increased starch solids content. These and other objects of my invention will be discussed more fully hereinbelow.

I have found that a starch resin adhesive composition may be prepared by the reaction of a starch, water-soluble reaction product of urea and formaldehyde, an acid catalyst and a certain prescribed amount of the sodium salt of hydrolyzed polyacrylonitrile in the presence of sufficient water to impart to the product a consistency suitable for subsequent application. As used in the present specification and in the appended claims, the term "starch" is intended to encompass such forms of starch as potato, corn, tapioca starch, and the like. Starches which have been modified to any desired extent as, for example, thin starch and oxidized starch may also be employed. The various flours containing starch as the principal ingredient, as well as low soluble dextrin, may also find employment in the adhesive composition of my invention.

The reaction product of urea and formaldehyde utilized in the process of my invention is a water-soluble product realized by the condensation of from about 1 to about 3 mols of formaldehyde for each mol of urea, preferably about 1.3 to about 2.1 mols of formaldehyde per mol of urea. Processes well known in the art may be employed in the preparation of the urea-formaldehyde reaction product. Generally, this reaction is carried out at an elevated temperature and at an alkaline pH until the desired degree of condensation has taken place at which time the condensation is stopped and the product then collected as by spray-drying, vacuum concentration, and the like. The amount of the urea-formaldehyde condensation product employed in my invention may vary over rather wide limits. In each instance the amount of the condensation product employed is based upon the amount of the starch present in the adhesive. Thus, the amount of the urea-formaldehyde reaction product that may be employed may vary from about 5% to about 20% by weight based on the total weight of the starch present. It is preferred, however, that from about 7.5% to about 15% by weight be employed.

The sodium salt of hydrolyzed polyacrylonitrile finding employment in my invention is water-soluble and possesses a molecular weight of at least 10,000. While there is no theoretical upper limit for the molecular weight of the water-soluble salt of the polymer, practical problems in the preparation and handling thereof impose such a limit. Thus, a polymer having a molecular weight greater than about 500,000 is difficult to handle and polymers having a higher molecular weight are not usually employed in my invention. The amount of the sodium salt of the polymer employed is based on the amount of the starch present in the adhesive. Accordingly, from about 5% to about 20% by weight of the polymer based on the weight of the starch may be used. Inasmuch as a large amount of the polymer is not necessary to give increased body and tack to the adhesive composition, it is preferred that from about 7.5% to about 15% by weight based on the weight of the starch of the polymer be used. These polymers are highly effective in the process of my invention and are obtained by hydrolyzing polymeric materials containing polyacrylonitrile. Also, these materials are relatively cheap. In certain instances, the polymer may be a homopolymer or the acrylonitrile may be copolymerized with small amounts of other materials such as vinyl pyridine, acrylic esters, and the like. Generally, however, it is the sodium salt of hydrolyzed polyacrylonitrile that is utilized in my invention. Processes well known in the art may be used to obtain the sodium salt of the polymer finding employment herein.

The adhesive composition of my invention is utilized at an acidic pH, generally within the range of from about 4.5 to about 6.0. It is, therefore, necessary that an acidic catalyst be present in the formulation. This catalyst is usually the salt of an organic acid and in water gives an acid reaction. Suitable catalysts that may be used are such as ammonium chloride, ammonium sulfate, and the like. Obviously, mixtures of these catalysts may be used if desired. Any suitable amount of the catalyst may be present in the formulation, the only requirement being that the pH of the formulation be within the range set forth hereinabove. I have found that the catalyst present in an amount varying from about 0.5% to about 10% by weight based on the amount of starch present, preferably about 0.5% to about 1.5% by weight, is sufficient.

In the preparation of the adhesive composition, the starch, resinous condensation product, sodium salt of the polymer and the catalyst are dispersed in a suitable quantity of water and are then subjected to an elevated temperature for a certain period of time. This cooking operation is similar to that employed in the gelatinization of starch. It is not necessary to employ as high a temperature as was previously thought necessary in the preparation of a starch resin adhesive. Thus, I have found that a temperature of from about 80° C. to about 100° C. is satisfactory when the material is cooked for a period of time varying between about 15 and 30 minutes. After the materials have been cooked at this elevated temperature, the heat is then removed and the composition allowed to assume room temperature. The adhesive is now ready for use. Not only does the formulation possess an increased tackiness and body over the formulations of the prior art but also an increased pot life is realized. The viscosity of the adhesive will depend upon the various amounts of the ingredients present in the formulation, the amount of water present and other obvious factors. I have found that viscosities as determined with a standard Brookfield viscosimeter varying between 100 to about 70,000 centipoises are satisfactory. The adhesive composition finds particular employment in fiber board laminations and in the production of bag seams in the production of paper bags. The adhesive may be applied in any manner well known in the art. Thus, knife spreaders and other conventional equipment may be utilized.

In order that those skilled in the art may more fully understand the inventive concept herein presented, the following examples are given for purposes of illustration and not limitation unless otherwise noted in the appended claims.

*Example 1*

300 parts of starch, 15 parts of ammonium chloride, 30 parts of a ureaformaldehyde condensation product and 30 parts of the sodium salt of hydrolyzed polyacrylonitrile were heated in the presence of 1200 parts of water for 15 minutes at 88° C. and then cooled to room temperature. The pH of the formulation was 5.3. The adhesive produced was a heavy, spreadable material. The amount of water employed was such that starch was present in the water as 20% solids. The molecular weight of the sodium salt of the polymer was 87,000.

*Example 2*

The procedure outlined in Example 1 was repeated except that the amount of water employed was such that the starch was present as a 15% solids. The pH of the adhesive was 5.25. The adhesive had a consistency that was heavy and possessed a good spreadability. The adhesive did not gel until 7 days after its production.

*Example 3*

The procedure outlined in Example 1 was repeated employing sufficient water to give a 10% solids concentration of the starch therein. The pH of the adhesive was 5.9 and the viscosity was 6,000 centipoises as determined by a Brookfield viscosimeter. The adhesive was still spreadable after 7 days.

*Example 4*

The procedure outlined in Example 1 was repeated using sufficient water to give a starch solids concentration of 30%. The pH of the formulation was adjusted to 4.9 and the viscosity was 360 centipoises as determined with a Brookfield viscosimeter. After 7 days the adhesive had not gelled.

*Example 5*

2700 parts of water, 225 parts of starch, 45 parts of a urea-formaldehyde condensation product, 15 parts of ammonium chloride and 30 parts of sodium salt of hydrolyzed polyacrylonitrile were heated for 15 minutes at 88° C. and then cooled to room temperature. 15 additional parts of the urea-formaldehyde condensation product were then introduced into the formulation. The pH of the adhesive was 5.55 and possessed a viscosity of 65,200 centipoises as determined with a Brookfield viscosimeter. After 3 days the adhesive was still spreadable.

*Comparative example*

The procedure outlined in the preceding example was repeated except that the sodium salt of hydrolyzed polyacrylonitrile was omitted from the formulation. The viscosity of this formulation was 38,400 centipoises and after 3 days the adhesive had gelled to an unusable state.

As set forth in the preceding examples, the amount of water present in the formulation may vary over rather wide limits. In each instance, the amount of water employed is so determined that a particular concentration of starch solids is present. Thus, a starch solids concentration varying from as low as 7.5% to as high as 40% may be employed in the invention.

I claim:

1. A water-resistant adhesive composition comprising sufficient water to yield a product suitable for application, starch, from about 5% to about 20% based on the weight of the starch of a water-soluble reaction product of urea and formaldehyde, from about 5% to about 20% based on the weight of the starch of the sodium salt of hydrolyzed polyacrylonitrile and sufficient acidic material to impart a pH within the range of from about 4.5 to about 6.0 to said composition.

2. A water-resistant adhesive composition comprising sufficient water to yield a product suitable for application, starch, from about 5% to about 20% based on the weight of the starch of a water-soluble reaction product of urea and formaldehyde wherein the mol ratio varies within the range of from about 1:1 to about 1:3, respectively, from about 5% to about 20% based on the weight of the starch of the sodium salt of hydrolyzed polyacrylonitrile and sufficient acidic material to impart a pH within the range of from about 4.5 to about 6.0 to said composition.

3. A water-resistant adhesive composition comprising sufficient water to yield a product suitable for application, starch, from about 5% to about 20% based on the weight of the starch of a water-soluble reaction product of urea and formaldehyde, from about 5% to about 20% based on the weight of the starch of the sodium salt of hydrolyzed polyacrylonitrile having a molecular weight of at least 10,000 and sufficient acidic material to impart a pH within the range of from about 4.5 to about 6.0 to said composition.

4. A water-resistant adhesive composition comprising sufficient water to yield a product suitable for application, starch, from about 7.5% to about 15% based on the weight of the starch of a water-soluble reaction product of urea and formaldehyde, from about 7.5% to about 15% based on the weight of the starch of the sodium salt of hydrolyzed polyacrylonitrile and sufficient acidic material to impart a pH within the range of from about 4.5 to about 6.0 to said composition.

5. A water-resistant adhesive composition comprising sufficient water to yield a product suitable for application, starch, from about 7.5% to about 15% based on the weight of the starch of a water-soluble reaction product of urea and formaldehyde wherein the mol ratio varies within the range of from about 1:1 to about 1:3, from about 7.5% to about 15% based on the weight of the starch of the sodium salt of hydrolyzed polyacrylonitrile and sufficient acidic material to impart a pH within the range of from about 4.5 to about 6.0 to said composition.

6. A water-resistant adhesive composition comprising sufficient water to yield a product suitable for application, starch, from about 7.5% to about 15% based on the weight of the starch of a water-soluble reaction product of urea and formaldehyde, from about 7.5% to about 15% based on the weight of the starch of the sodium salt of hydrolyzed polyacrylonitrile having a molecular weight of at least 10,000 and sufficient acidic material to impart a pH within the range of from about 4.5 to about 6.0 to said composition.

7. A water-resistant adhesive composition comprising sufficient water to yield a product suitable for application, starch, from about 5% to about 20% based on the weight of the starch of a water-soluble reaction product of urea and formaldehyde wherein the mol ratio varies within the range of from about 1:1 to about 1:3, respectively, from about 5% to about 20% based on the weight of the starch of the sodium salt of hydrolyzed polyacrylonitrile having a molecular weight of at least 10,000 and sufficient acidic material to impart a pH within the range of from about 4.5 to about 6.0 to said composition.

8. A water-resistant adhesive composition comprising sufficient water to yield a product suitable for application, starch, from about 7.5% to about 15% based on the weight of the starch of a water-soluble reaction product of urea and formaldehyde wherein the mol ratio varies within the range of from about 1:1 to about 1:3, respectively, from about 7.5% to about 15% based on the weight of the starch of the sodium salt of hydrolyzed polyacrylonitrile having a molecular weight of at least 10,000 and sufficient acidic material to impart a pH within the range of from about 4.5 to about 6.0 to said composition.

9. A process of making a water resistant adhesive composition which comprises dispersing in a suitable quantity of water, ingredients including essentially starch, from about 5 to about 20% of a urea-formaldehyde resin, from about 5 to about 20% of the sodium salt of hydrolyzed polyacrylonitrile, said percentages being by weight based on the amount of starch present, and sufficient acidic material to maintain a pH within the range of about 4.5 to about 6.0, cooking the resulting composition at a temperature of from about 80° C. to about 100° C. for a period of from 15 to 30 minutes, and allowing the reaction product to cool.

10. A process of making a water resistant adhesive composition which comprises dispersing in a suitable quantity of water a preparation including essentially starch, from 7.5 to 15% urea-formaldehyde resin, from 7.5 to 15% of the sodium salt of hydrolyzed polyacrylonitrile and from about 0.5% to about 10% of an acidic material to maintain a pH within the range of from about 4.5 to about 6.0, said percentages being by weight and based on the amount of starch present; cooking the preparation at a temperature of from about 80° C. to 100° C. for a period of from 15 to 30 minutes and allowing the reaction product to cool.

11. The process of claim 10 in which sufficient acidic material is added to maintain a pH of about 5.5 and the cooking is at a temperature of about 88° C. for about 15 minutes.

References Cited in the file of this patent

UNITED STATES PATENTS

| | | |
|---|---|---|
| 2,245,491 | Menger et al. | June 10, 1941 |
| 2,407,071 | Gill et al. | Sept. 3, 1946 |
| 2,629,699 | Moore | Feb. 24, 1953 |
| 2,639,240 | Ehle | May 19, 1953 |